Sept. 22, 1959

G. F. WALES 2,905,461

DIFFERENTIAL LIQUID SPRING

Filed July 2, 1956

INVENTOR.
GEORGE F. WALES

BY

ATTORNEY

United States Patent Office 2,905,461
Patented Sept. 22, 1959

2,905,461

DIFFERENTIAL LIQUID SPRING

George F. Wales, Kenmore, N.Y.

Application July 2, 1956, Serial No. 595,280

20 Claims. (Cl. 267—64)

The present invention relates to an improved suspension system. More particularly, the present invention relates to improvements in pressure vessels known as liquid springs, which may be employed as the resilient devices in suspension systems.

So-called liquid springs take advantage of the limited compressibility under pressure of compressible liquids such as oil and compressible solids, such as the recently developed silicone compounds. An early form of liquid spring comprised a chamber or vessel filled completely with a liquid and having a single piston reciprocable therein, which, under action of an outside force, compressed the liquid to provide a high-pressure cushion for the elements between which the liquid spring was interposed. Single piston devices of this sort were satisfactory in many applications, but in many situations could not be used because of inherent limitations, relating to high internal pressures, short stroke length, and difficulty of design.

As a result, liquid springs have been developed having two axially-aligned pistons of different operating areas, internally connected through a flexible medium, such as a strong steel wire. These improved liquid springs provided longer stroke lengths with the development of relatively lower internal pressures.

However, a liquid spring having opposed internally connected pistons of different operating areas nevertheless is subject to some design limitations because of the necessary minimum size of the operating area of the smaller piston. To obtain an effective seal, the diameter of the smaller piston is necessarily about one-half inch, or larger. This limitation on the diameter of the smaller piston inherently imposes corresponding limitations on the length of stroke and internal pressures which may be developed. Furthermore, for design simplicity, this type of spring usually employs pistons which are axially opposed, thus further limiting the applications for which this type of liquid spring is available.

An object of the present invention is to provde a resilient device of the liquid spring type having a practical design capable of substantially universal application, providing low force, and having long stroke characteristics.

Another object of the invention is to provide a resilient device of the liquid spring type particularly adapted for use in suspension systems, and capable of being interposed between elements or bodies under variable conditions where heavy duty service requirements are present, and which is effective over a wide range of applied forces, including relatively small forces.

A related object of the invention is to provide a resilient device of this sort which is particularly adapted for use as a spring element for cushioning the bodies of automotive vehicles.

Another object of the invention is to provide a resilient device of the liquid spring type having characteristics which may be precisely controlled by simple mechanical modifications of the device to provide selectively varying but controlled reaction to external applied force.

A related object of the invention is to provide a liquid spring having a plurality of pistons reciprocable therein for the development of differential forces, where the pistons may be positioned in any desired location relative to each other.

A still further object of the invention is to provide a resilient device which, while operating to cushion normal loads, as in a motor vehicle, is further capable of cushioning overload conditions efficiently as they occur.

A related object is to provide a resilient device of the character described including an arrangement of pistons which provides a differential in pressure between at least two pistons in the assembly, whereby a relatively small force may develop a desired cushioning effect.

Another related object is to provide a type of liquid spring structure having a piston arrangement in which a differential in pressure is developed between the pistons, and in which at least one piston is variably connected with the other piston or pistons in the arrangement for a controlled but variable differential in pressure therebetween.

Still another related object of the invention is to provide a resilient device in which, under abnormal or overload conditions, the differential action will be rendered ineffective, allowing the full area of one of the pistons to cushion the relatively much higher force than applied by such overload.

These and other objects of the invention are accomplished, in one embodiment thereof, by providing a spring body having a chamber adapted to contain a compressible substance, such as an oil, and having two axially-aligned pistons at opposite ends thereof with working areas of different respective sizes in contact with the compressible substance. The two pistons are connected externally of the pressure chamber by a yoke having an upper arm and a lower arm, and having one of the two pistons connected to each arm. When the device is used in a suspension system, the spring body is seated within a cup-like holder in an arm or other extension of a supporting element, and the load is applied through the yoke. The load actuates the piston having the larger operating area so that it reciprocates inwardly of the pressure chamber, compressing the substance therein and urging the piston having the smaller operating area outwardly of the pressure chamber. The outward movement of the piston having the smaller operating area is restricted by the connecting yoke. There is thus developed within the pressure chamber a compression of the substance therein proportionate to the differential in operating area between the two pistons. The pressure thus produced in the chamber is relatively low and may be controlled by regulation of the differential in area between the two pistons.

In this same embodiment of the invention, the initial load on the device may be regulated by controlling the initial position of one of the two pistons. Desirably, this control is accomplished by a threaded nut in the lower arm of the yoke acting against the piston rod of the piston having the smaller operating area.

The load limit achieved during compression of the liquid is the result of the differential between the areas of the pistons and may be predetermined by the size of the piston operating areas and the length of stroke allowed the pistons. After the predetermined load limit has been reached, means may be provided to arrest further movement of the piston having the smaller operating area, while allowing slippage of the piston rod of this piston in a guide bearing in the lower arm of the yoke, and while compressive inward movement of the larger piston is allowed to continue, effecting further compression of the substance in the pressure chamber. The character of the device may then change at a predetermined load to a short-stroke, high pressure spring.

In another embodiment of the invention, the structure just described may be modified by the inclusion in the device of an additional piston located in the pressure chamber and reciprocable therein to a controlled degree by the engagement of a cam follower on the piston rod of the additional piston against a cam surface disposed in the connecting yoke. Where an additional piston of this type is provided, the differential in operating areas may be maintained, so that the piston forced inwardly by the load applied to the yoke has a greater operating area than the combined operating areas of the other two pistons.

Other embodiments of the invention, and other objects and advantages of the invention, will appear hereinafter from the following description and from the recital of the appended claims. The invention may be best understood by consideration of the following detailed description, taken in connection with the accompanying drawings, in which:

While the novel resilient device or liquid spring of this invention is adapted for many applications or uses, it is here disclosed primarily as a device for providing a normal and overload suspension for machines, or for cushioning the unsprung weight, and the weight when loaded, of the body of a motor vehicle. Accordingly, the description will refer primarily to the use of the novel resilient device of the invention in a suspension system, it being understood nevertheless that many other applications therefor are contemplated.

Figure 1:
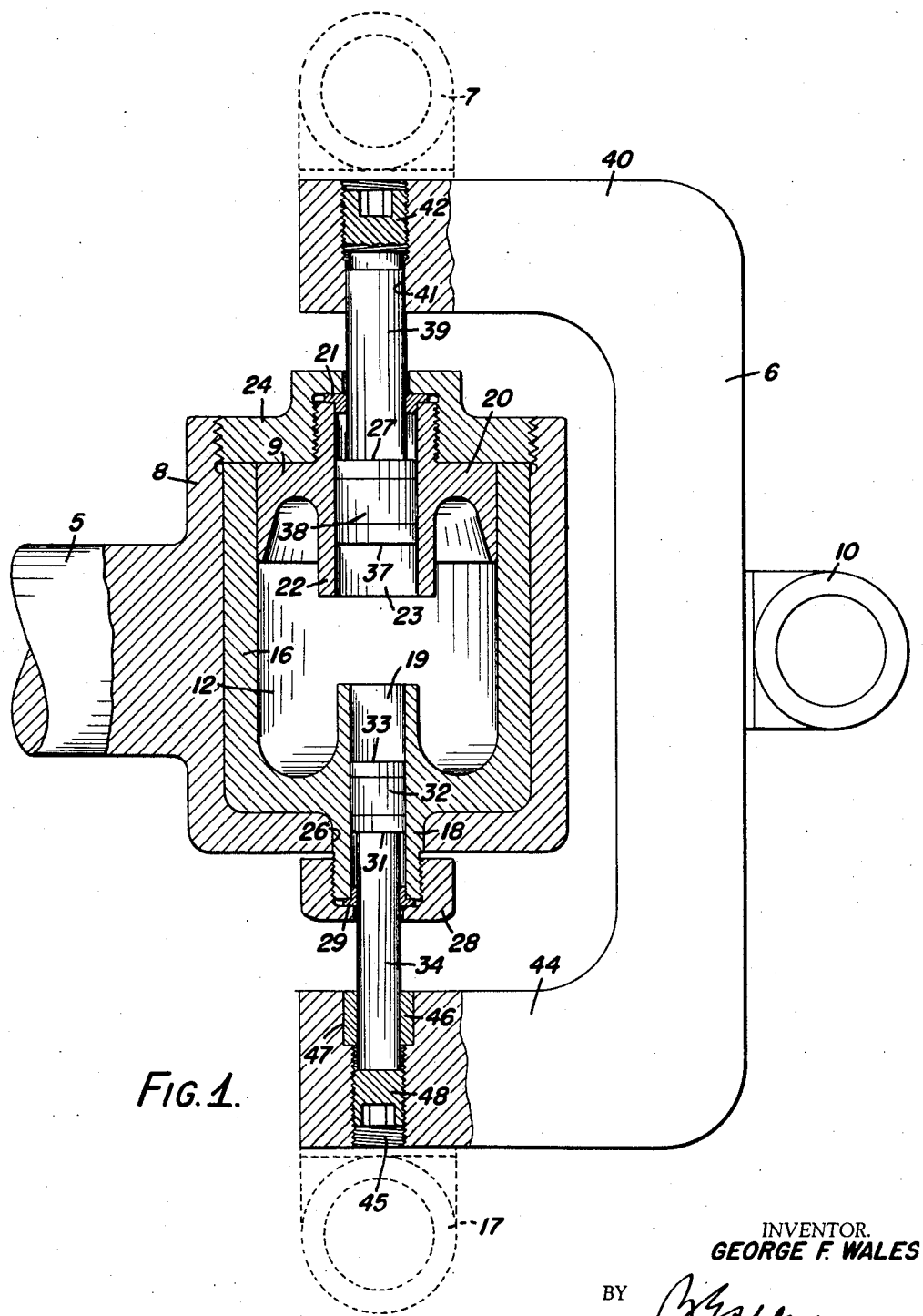
Fig. 1 is an axial section of a resilient device or liquid spring made according to one embodiment of the invention.

The novel resilient device illustrated in Fig. 1 includes a cup-like holder 8 secured to a supporting element 5, and which may be a part thereof, as illustrated. Within the holder 8 there is seated a liquid spring 9 comprising a container 16 having a chamber 12 which is completely filled with a substance of limited compressibility, such as oil.

The container 16 is closed at its upper end by a closure plug 20 which is brazed in place and which is formed with a centrally disposed cylinder 22 having a bore 23. The container 16 is closed at its lower end by an integral bottom wall that is formed with a centrally-disposed cylinder 18. The bore 19 of the cylinder 18 is axially aligned with the bore 23 of the cylinder 22. Both cylinder 22 and cylinder 18 protrude inwardly and extend outwardly of container 16. The downwardly-extending outwardly-protruding portion of cylinder 18 projects through an opening 26 in the bottom of the holder 8, and is externally threaded for engagement with a lower retainer nut 28. The upwardly-extending outwardly protruding portion of cylinder 22 is externally threaded for engagement with a complementary retainer nut 24. The retainer nut 24 is threaded around its periphery to engage corresponding threads in the holder 8.

The liquid spring 9 is thus removably secured in the holder 8 by the two retainer nuts 24 and 28 respectively. While the container 16 of the liquid spring could be integral with holder 8, it is preferred that the spring be an independent unit since it is susceptible of other uses than that specifically illustrated in Fig. 1.

A lower piston 32 is adapted to slide within the cylindrical bore 19 of the lower cylinder 18 of container 16, and its reduced rod 34 extends outwardly through a seal 29 which is held in place by the lower retainer nut 28. An upper piston 38 mounted coaxial with the lower piston 32 reciprocates within the bore 23 of the upper cylinder 22. The reduced piston rod 39 of the upper piston 38 extends upwardly and outwardly of the chamber 12, through the seal 21 which is held in place by the upper retainer nut 24.

Each of the seals 21 and 29, backed by the respective retainer nuts 24 and 28, function as stop members to limit the outward movement of the pistons by engaging shoulders 27 and 31 respectively on the respective pistons.

The compressible substance used in the chamber 12 may be selected from a wide number of suitable substances, such as silicone liquids and silicone solids, mineral oils, and other liquids and compressible plastics, such as now widely used in liquid springs. To prevent the escape of the compressible substance around the pistons, each piston is provided with a seal which engages the walls of the cylinder within which the piston rides. Seals of the type commonly employed in liquid springs may be used. A seal of the type shown in the Taylor patent, 2,742,333, issued April 17, 1956, is satisfactory. This type of seal also prevents the galling which would result if metal-to-metal contact occurred. For simplicity of illusrtation, no piston seal is shown in the drawings.

The upper piston 38 has a relatively large operating area 37 in contact with the compressible substance in the chamber 12. In contrast, the lower piston 32 has a relatively smaller operating area 33 in contact with the compressible substance. This difference in the operating areas of the two pistons, respectively, causes a differential action between the two pistons, the result of which is that there is a net differential force, which is relatively low, operable between the two pistons. If the pistons were mounted for free movement under this net differential force, its end product would be a longer distance of travel for the smaller piston. However, in the present novel resilient device, the movements of the pistons are controlled through an external connecting yoke 6. The rod 39 of the upper piston is slidably seated within a recess 41 in the upper arm 40 of the yoke, abutting against a nut 42 threaded into the recess. The shank 34 of the lower piston 32 likewise is slidably seated within a recess 45 in the lower arm 44 of the yoke. For reasons stated hereinafter, the recess 45 includes a counterbore 47 within which a guide bearing 46 is seated in snug engagement with the shank 34 of the lower piston to define a lost motion connection.

When the device shown in Fig. 1 is installed in a motor vehicle, such as a small pleasure car, for example, as a part of the suspension system thereof, it may, by way of example, replace the conventional coil spring and shock absorber of a front dirigible wheel. It lends itself readily to use for front wheel suspension since the pistons are a direct substitute for king pins. The supporting element 5 may comprise the non-drive axle for a pneumatic tire (not shown), while the yoke 6 is securely connected to the chassis as by a support ring 10. When the wheel is steered, the supporting element pivots about the axis of the pistons 32 and 38. If desired, means such as rings 7 and 17 may also be provided on the yoke 6 to support steering controls leading to the wheel.

In assembling the resilient device of Fig.1, the compressible liquid is preferably initially preloaded to place the substance in the chamber 12 under a selected pressure. This may be accomplished by first assembling the liquid spring 9, the amount of compressible substance being predetermined, for convenience in assembly, such that the pistons are in direct contact therewith. The yoke is then placed in position, first slidably inserting the rod of one piston in its recess in the yoke, then the other. After both piston rods are so inserted, the upper piston positioning nut 42 is inserted in the recess 41 in the upper arm 40 of the yoke, and is tightened down at least flush with the surface of the upper arm 40.

The threaded pre-load adjuster nut 48 is then inserted in the recess 45 in the lower arm 44 of the yoke, and is screwed upwardly against the rod or shank 34 of the lower piston 32 to first slidably seat both of the rods 34 and 39. Continued advancement of the nut 48 effects sliding of the rod 34 with respect to the bearing 46 and forces the lower piston into the chamber 12 and places the compressible substance within the chamber under compression.

The pressure thus developed in the chamber 12 can, in this way, be made such as to approximate the unsprung weight at one corner of the vehicle body. By installing four of these resilient devices, one at each corner of a car, the latter may be resiliently supported in unsprung or unloaded condition.

The novel features of the invention will now be apparent, if it is understood that the four-wheeled vehicle frame is secured through the yokes thereof to at least four of these devices, and is supported in unloaded condition by providing pistons 38 and 32 for each of the four resilient devices, such that the area of each larger piston 38 differs from the area of the associated piston 32 to such an extent that the net pressure developed in each device, which is the result of the differential in area between the two pistons, is a force sufficient to support the body.

If now the vehicle is loaded, as by the presence of a driver and one or more passengers, or sprung weight is otherwise introduced, additional force will be transmitted through the yokes to the supporting elements 5, and the chassis and yokes will be lowered correspondingly. In use of the vehicle, the yokes will be in more or less continuous up and down displacement. Under such conditions, the larger piston 38 will reciprocate. When the larger piston 38 moves inwardly of the chamber 12, the pressure of the compressed substance in the chamber will be increased to a variable extent, because of the difference in area between the larger piston 38 and the smaller piston 32. The smaller piston 32 is subject to pressure from the compressed substance, of course, and is urged outwardly. Its outward movement is normally restrained by the yoke which connects it rigidly to the larger piston, but if the substance is compressed sufficiently, the piston 32 moves outwardly until its shoulder 31 abuts against the seal 29 and the retainer nut 28. In this way, the resiliency of the compressible substance, when thus further compressed, over and beyond the preload, may be availed of to provide adequate cushioning of the vehicle body when in use, with maximum riding quality.

In the construction just described, by reason of the proportion of the parts, the two externally connected pistons are normally free to shift up and down together with the yoke 6 as a unit between their limits of stroke, since the larger piston 38 will always under load be below its limit of movement where its shoulder 27 would abut against its seal 21 and its retainer nut 24. The shoulder 31 of the smaller piston 32 will likewise not bottom under normal usage, and will bottom only under an overload. However, when the piston 32 has bottomed in response to an overload, the lost motion connection between the yoke 6 and the piston 32 permits the bearing 46 to slide on the rod 34.

The device illustrated in Fig. 1 and illustrating one embodiment of applicant's invention is not limited to the precise application described above, however. In this application, the frame of the car is meant to be secured to or suspended from the yoke 6 in any convenient manner, while the wheel axle is secured to or is integral with the supporting element 5. Obviously, other types of loading may be applied to the resilient device through the yoke.

The resilient device 9 may be expected to meet a variety of loading conditions fully, and may be expected to serve its purpose resiliently and smoothly. However, there are instances where severe overload conditions may be expected. As an instance, a greater than intended load may be placed upon the body of a motor vehicle, such as a truck. The resilient device 9 shown in Fig. 1 is intended to meet the foregoing and other overload conditions. The resilient device is normally preloaded, as previously described, to provide resilient support for the normal unsprung weight normally carried by the resilient device. The device is so proportioned as to meet normal loading conditions by differential compression of the compressible substance in the chamber 12. However, should an overload condition occur, the larger piston 38 will be forced inwardly of the chamber 12, and the shoulder 31 of the smaller piston 32 will bottom against its seal 29 and its retainer nut 28. Additional overloading will effect further downward movement of the yoke 6 which will then be supported by simple direct compression of the compressible substance in the chamber 12 by the larger piston 38. Under overload conditions, therefore, direct compression supports the load, rather than differential compression. With the smaller piston 32 bottomed against the seal 29 by the overload force, and with the lower arm 44 of the yoke 6 continuing to move away from the holder 8, there will be a relative axial sliding movement between the piston rod 34 and the guide bearing 46. The relative axial sliding will continue so long as a varying overload force is applied.

As long as the overload remains, the resulting action results in compression of the compressible substance by the force applied through the piston 38 alone. Under such conditions, the resistant force and supporting force of the resilient device 9 is that of the larger piston 38 alone. Hence, the full area of that piston is acted upon by the pressurized substance, since there will then be no differential pressure action between the two pistons. This provides a short-stroke, hard-force, overload spring condition. In this manner, a very powerful pressure is developed in the resilient device 9, as occurs in the known single-piston types of liquid springs. The overload condition which has been forced upon the vehicle is thus coped with adequately, and any possible resulting damage is avoided.

Figures 2, 3:
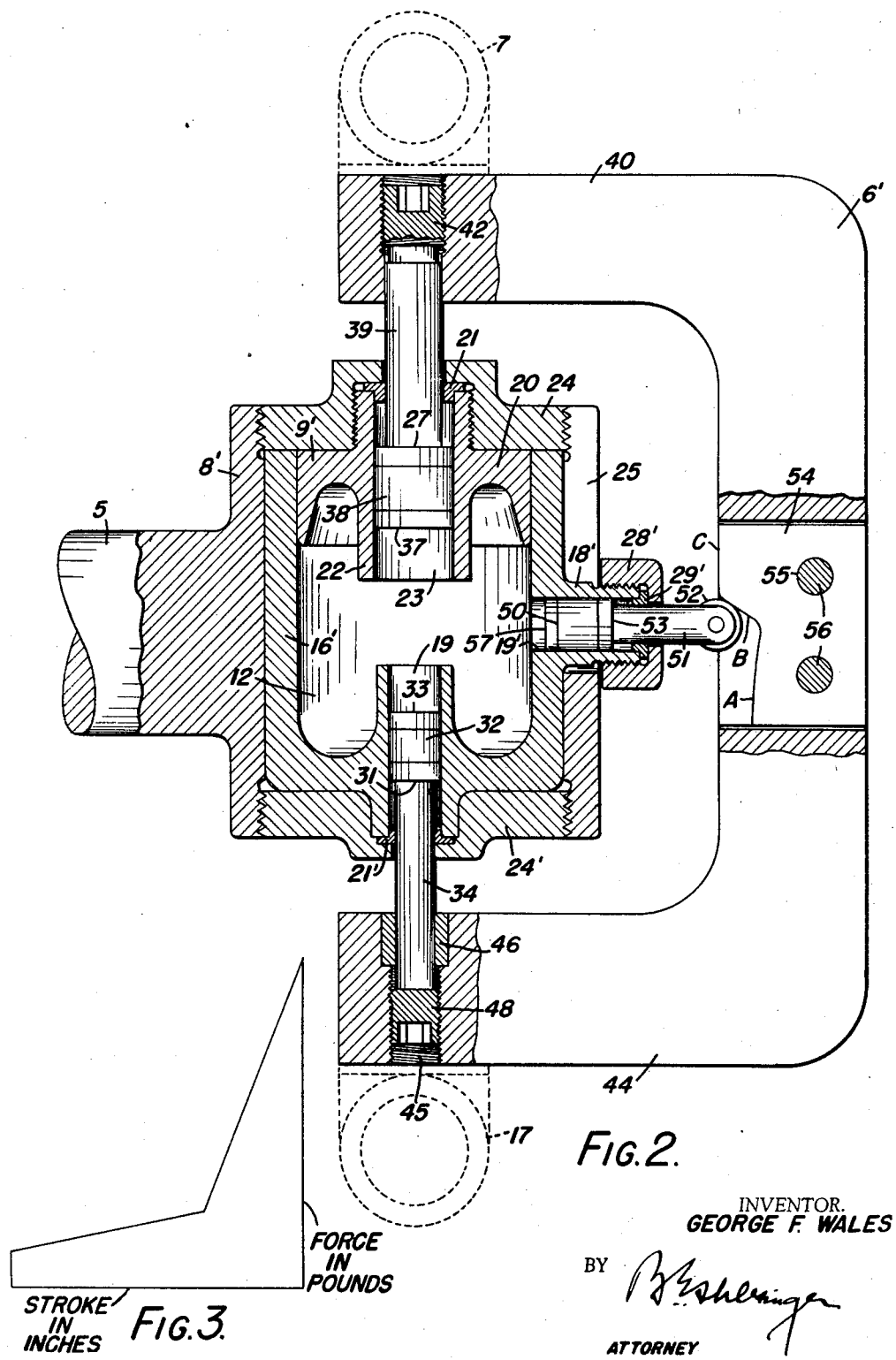
Fig. 2 is an axial section of a modified resilient device having an additional, variably-connected piston for control over the resilient characteristics of the device.
Fig. 3 is a diagrammatic representation showing the total amount of energy absorbed by the device shown in Fig. 2 during compression thereof.

While the foregoing embodiment of the invention has many advantages in simplicity of construction, elimination of a number of hitherto required parts, and improved suspension characteristics, further advantage can be obtained by the introduction of one or more additional pistons for reciprocation in the chamber 12. Fig. 2 shows such an embodiment of the invention. As shown, the resilient device 9' is generally similar to that previously described. However, since there is an additional piston reciprocable through the wall of the container 16', some modification is made in the bottom retainer nut for ease of access to the resilient device for adjustments, etc. Thus, the bottom retainer nut 24' may be constructed to correspond in size and function to the upper retainer nut 24, including a seal 21'.

The container 16' includes an additional open end neck 18' having a bore 19' within which the additional piston 50 reciprocates. The open end neck 18' is threaded on its exterior surface and a retainer nut 28' is secured thereover, compressing a seal 29'. The container 16' is slotted as indicated by the numeral 25 to allow the liquid spring to be placed in and removed from the holder 8'. The piston rod 51 is reduced in size from the piston head, thus forming a shoulder 53 which abuts against the seal 29 and the retainer nut 28' when the additional piston 50 is urged outwardly of the chamber 12 to the limit of its stroke.

A cam 54 is secured in the yoke 6' by a pair of fasteners 56, extending through apertures 55 in the cam. The cam 54 has a cam surface indicated generally by the letters A, B, C. A roller 52 is secured to the extremity of the piston shank 51 and rides on the cam surface as a cam follower.

All of the pistons operating on the compressible substance in the chamber 12 remain operatively connected through the yoke 6'. The upper piston 38 and the lower piston 32 are rigidly secured together as before, with the reduced rod 34 of the lower piston 32 seated within the recess 45 in the lower arm of the yoke in slidable engagement for free relative movement therein under overload conditions. The additional piston 50 is operatively connected to the yoke 6' through a variable connection, and the reciprocation of this piston is controlled by the movement of the cam follower 52 over the cam surface A, B, C.

Again assuming that the resilient device 9' is employed in the suspension system of an automotive vehicle, a force downwardly directed may be applied to the resilient device 9' through the yoke 6' and its upper and lower suspension rings 7 and 17, respectively. In this embodiment of the invention, the operating area 37 of the piston 38 is greater than the combined operating areas of the two other pistons respectively, 32 and 50. The applied load forces the larger piston 38 into the chamber 12, exerting a compressive force on the substance therein. The smaller piston 32 is moved downwardly through the same vertical distance as the larger piston 38 because of the restraint exerted by the yoke 6'. When the resilient device 9' carries only its normal unsprung load, with preload compression exerted on the compressible substance in the chamber 12 through adjustment of the threaded preload adjuster nut 48, the third piston 50 will occupy a position determined by the shape of the cam surface A, B, C. In Fig. 2, the device is shown under load. Under preload only, the cam follower 52 would rest on the portion A of the cam surface, and the piston would be positioned outwardly of the chamber 12.

Depending upon the suspension characteristics desired, various contours may be employed for the cam surface A, B, C, upon which the cam follower 52 rides. As illustrated in Fig. 2, the cam surface A may permit only slight movement of the piston 50 during initial downward movement of the yoke 6' and initial compression of the substance in the chamber 12. At a predetermined load point, the cam surface B forces inward movement of the piston 50 sufficient to cause an additional differential compression of the substance in the chamber 12, thus modifying the characteristics of the resilient device 9' by decreasing its length of stroke and increasing the developed pressure within the chamber 12. Thus as the change in contour from surface A to surface B is engaged by the roller 52 during relative movement of the yoke 6', the effective deflection rate or spring rate changes to thereby produce an operatively variable deflection rate, wherein the deflection varies in response to the extent of the actuation or operation of the assembly.

At another predetermined loading point, for example, at the point where overload conditions prevail and the shoulder 31 of the lower piston 32 is bottomed against its seal 21' and its retainer nut 24', the roller 52 will ride on portion C of the cam 54 and further reciprocation of piston 50 will be stopped. At this point, the resistant force of the device is that of the larger piston 38 alone. This provides a short stroke, high force, overload spring condition. This overload action is very similar to the overload action of the simpler, two piston device illustrated in Fig. 1. A very powerful pressure is then developed in the spring, such as occurs in the known single-piston types of liquid springs. Again, the overload condition is coped with adequately, and possible resulting damage to the suspended body is avoided. Under these overload conditions, slippage of the shank 34 of the lower piston 32 occurs within its guide bearing 46 when the shoulder 31 of the piston abuts against seal 21'. The engagement of the cam follower 52 on the cam surface C corresponds to the "bottoming" of the lower piston 32, since in both cases reciprocation of these pistons is arrested.

A great advantage of a differential area resilient device having a variable external connection of the type described is that greater flexibility is allowed in the design of the device. Since tremendous pressures are generated even through slight compression of the compressible substances usually employed, only a very small effective differential area is necessary for resilient suspension. By careful design of the working areas of the several respective pistons, any differential area desired can be obtained. By corresponding careful design of the cam surface or surfaces of the cam or cams employed, the respective working areas may be actuated at any desired time, and in this way any desired suspension characteristics may be obtained.

A further advantage is that the use of axially aligned, opposed differential area pistons is no longer necessary. As many additional cam-operated pistons as desired may be incorporated in the device, and the piston identified as the lower piston 32 may be eliminated entirely. Applicant's devices thus provide a new freedom in flexibility of design hitherto unavailable, with a correspondingly wide range of suspension characteristics.

In the foregoing discussion, a preferred embodiment of the invention has been described in which the variable external connection permitted an inward reciprocation of the cam-controlled piston upon the application of force to the device. As will be appreciated, however, the variable connection may be equally well employed to cause outwardly directed movement of the cam-controlled piston upon the application of force. The invention is obviously adapted to produce any combination of suspension characteristics desired through a single resilient device of the so-called liquid spring type. The suspension characteristics may be controlled by the number of variably connected pistons employed, and also by the contour of the cam surfaces employed. Such a variety of suspension characteristics, if obtainable through prior art devices, were obtainable only through a multiplicity of mechanical components of considerable complexity whose adjustment for modification in suspension characteristics would challenge the most skilled. In contrast, applicant's device provides a variety of suspension characteristics through a single device which may be modified by extremely simple adjustments or substitution of parts.

While the invention has been described in connection with several embodiments thereof, then, it will be understood that it is capable of further modification. This application is intended to cover any variations, uses, or adaptations of the invention, following, in general, the principles of the invention and including such departures from the present disclosure as come within known or customary practice in the art to which the invention pertains and may be applied to the essential features hereinbefore set forth and as fall within the scope of the invention or the limits of the appended claims.

Having thus described my invention, what I claim is:

1. A resilient device which may be interposed between a supporting element and an element comprising a load to be resiliently supported by said device and operable as an outside force thereon, comprising a body having a chamber therein filled with a coompressible non-gaseous substance, at least two piston in said chamber having, respectively, operating areas of different size, a yoke external of said body connecting said pistons, at least one of said pistons being adjustably engageable with said yoke, said one of said pistons being engageable by a variable force outside said body to move the same in one direction relative to said chamber to compress the substance in said chamber, the resulting action operating to move the other piston in unison therewith, said first piston, upon lessening of the outside force, shifting in the opposite direction and controlling the movement of the second piston therewith through said external yoke.

2. A resilient device which may be interposed between a supporting element and an element comprising a load to be resiliently supported by said device and operable as an outside force thereon, comprising a body having a chamber therein filled with a compressible non-gaseous substance at least two pistons reciprocable in said chamber, means having a fixed length external of said body slidably receiving said pistons and coordinating the reciprocation of said pistons, said pistons having operating areas in contact with said compressible substance within the chamber, at least one piston disposed to be actuated by a force outside said body and having a total operating area greater than the remainder of said pistons, said force being operative to reciprocate said pistons and thereby compress said substance, the net difference in operating areas of said pistons effecting the development of a relatively low pressure by said resilient device.

3. A resilient device which may be interposed between a supporting element and an element comprising a load to be resiliently supported by said device and operable as an outside force thereon, comprising a body having a chamber therein filled with a compressible non-gaseous substance, two axially-aligned, spaced pistons reciprocable in said chamber and having, respectively, operating areas of different size, means external of said body directly connecting said two pistons together for reciprocation in unison said means also permitting reciprocation of the larger area piston alone, each of said two pistons being mounted to project in part out of said chamber, whereby one may be engaged by an outside force to actuate both pistons to compress said substance in said chamber.

4. A resilient device which may be interposed between a supporting element and an element comprising a load to be resiliently supported by said device and operable as an outside force thereon, comprising a body having a chamber filled with compressible non-gaseous substance, at least two pistons in said chamber having operating areas in contact with said substance, a member external of said body connecting said pistons and thereby coordinating their reciprocation to permit joint reciprocation for controlled compression of said substance up to a predetermined load limit as well as sole reciprocation of one of said pistons beyond said limit, at least one of said pistons being disposed for actuation by said outside force and having an operating area greater than the remainder, and means carried by said body and operable, when said load limit is exceeded, to restrain at least one piston of the remainder from further action whereby the load-actuated operating area may then act to compress the substance to carry the overload resiliently.

5. A resilient device which may be interposed between a supporting element and an element comprising a load to be resiliently supported by said device and operable as an outside force thereon, comprising a body having a chamber filled with a compressible non-gaseous substance, two pistons in said chamber having, respectively, operating areas of different size, rigid means external of said body directly connecting together said two pistons for operation as a unit to compress said substance to a predetermined load limit, said rigid means also permitting the larger area piston to move alone, the piston having the larger operating area being disposed to be actuated by said outside force, means spaced from said rigid means and disposed to engage the other piston when said predetermined load limit is exceeded for restraining the other piston from further action, so that said piston of larger operating area may then act alone to compress said substance further in said chamber to develop high pressure for carrying the overload resiliently.

6. A resilient device which may be interposed between a supporting element and an element comprising a load to be resiliently supported by said device and operable as an outside force thereon, said device comprising a body having a chamber filled with a compressible non-gaseous substance, means for sealing against escape of said substance from said chamber, a pair of pistons in said chamber of different operating areas, respectively, rigid means external of said body connecting said two pistons so that they may be operated as a unit to compress said substance to a predetermined load limit, the piston having the larger operating area being movable by said load element to actuate both pistons and being affixed to said external rigid means, the other piston being slidably seated in a recess in said external rigid means, and stop means carried by said body for restraining the piston having the smaller operating area from operation in unison with the piston component having the larger operating area once the predetermined load limit has been exceeded.

7. The resilient device of claim 6, wherein said external rigid means connecting said piston components includes means for selectively reciprocating one piston with respect to said chamber to regulate the initial compression of said substance.

8. A resilient device which may be interposed between a supporting element and an element comprising a load to be resiliently supported by said device and operable as an outside force thereon, comprising a body having a chamber therein filled with a compressible non-gaseous substance, at least two pistons reciprocable in said chamber and having, respectively, operating areas of different size, means external of said body connecting said pistons for controlling reciprocation thereof at an operatively variable deflection rate, and at least one of said pistons being disposed to be engageable by a force outside said body to operate said piston thereby to compress said substance, the net difference in the operating areas of said pistons effecting the development of a relatively low pressure in said chamber.

9. A resilient device which may be interposed between a supporting element and an element comprising a load to be resiliently supported by said device and operable as an outside force thereon, comprising a body having a chamber therein filled with a compressible non-gaseous substance, at least two pistons reciprocable in said chamber and having at least two operating areas of different respective sizes in contact with said compressible substance, means external of said body and having a variable connection with said pistons for controlling reciprocation thereof simultaneously at an operatively variable deflection rate, at least one piston having the larger operating area being disposed to be engageable by a force outside said body to operate said pistons and thereby to compress said substance, the net difference in said operating areas effecting the development of a relatively low pressure by said device.

10. A resilient device which may be interposed between a supporting element and an element comprising a load to be resiliently supported by said device and operable as an outside force thereon, comprising a body having a chamber filled with a compressible non-gaseous substance, at least two pistons in said chamber having, respectively, operating areas of different size, means external of said body connecting said two pistons for operation together and including a controlling connection with one of said pistons to compress said substance at an operatively variable deflection rate to a predetermined load limit, the other of said two pistons being disposed to be actuated by said outside force, and means for restraining said one piston from operation in unison with said actuated piston when said predetermined load limit has been exceeded.

11. A resilient device which may be interposed between a supporting element and an element comprising a load to be resiliently supported by said device and operable as an outside force thereon, comprising a body having a chamber filled with a compressible non-gaseous substance, at least two pistons in said chamber having, respectively, operating areas of different size, means external of said body connecting said pistons for operation as a unit and including a controlling connection with at least one of said pistons to compress said substance at an operatively variable deflection rate to a predetermined load limit, the piston having the greatest proportion of the total operating area being disposed to be actuated by said outside force, means disposed to engage at least one other piston when said load limit is exceeded for restraining the other piston from further action, so that the said actuated piston may then act to further compress the substance in said chamber to develop high pressure for carrying the overload resiliently.

12. A resilient device which may be interposed between a supporting element and an element comprising a load to be resiliently supported by said device and operable as an outside force thereon, comprising a body having a chamber filled with a compressible non-gaseous substance, a plurality of pistons reciprocable in said chamber and jointly having a total operating area in contact with said substance, means external of said body interconnecting said pistons for operation as a unit to compress said liquid to a predetermined load limit and including a controlled connection with at least one of said pistons for effecting said compression at an operatively variable deflection rate, at least one of said pistons having the larger proportion of said total operating area in contact with said substance and being actuatable by said outside force, means disposed for restraining any further action between at least one other of said pistons having the remainder of the total operating area and said substance when said load limit is exceeded, so that the larger operating area may then act to compress the liquid in said chamber further to develop high pressure for resiliently carrying the overload.

13. A resilient device which may be interposed between a supporting element and an element comprising a load to be resiliently supported by said device and operable as an outside force thereon, said device comprising a body having a chamber filled with a compressible non-gaseous substance, means for sealing against escape of said substance from said chamber, at least three pistons in said chamber, means external of said body connecting said three pistons so that they may be operated as a unit to compress said substance to a predetermined load limit, one piston having the greater proportion of the entire operating area of said pistons being in contact with said compressible substance, said one piston being engageable by said outside force to actuate all of said pistons, and means for restraining the pistons having the smaller remaining operating area from operation in unison with the piston having the larger operating area when said predetermined load limit has been exceeded.

14. A resilient device which may be interposed between a supporting element and an element comprising a load to be resiliently supported by said device and operable as an outside force thereon, comprising a body having a chamber therein filled with a compressible non-gaseous substance, two axially-aligned, spaced pistons reciprocable in said chamber, at least one additional piston also reciprocable in said chamber spaced from said axially-aligned pistons, means connecting said two axially-aligned pistons together for reciprocation in unison, means external of said body providing a variable connection between at least one of said axially-aligned pistons and said additional piston for controlling reciprocation of said additional piston in response to reciprocation of said one of said axially-aligned pistons, one of said pistons being disposed to be engaged by an outside force to actuate said pistons to effect a differential compression of the substance in said chamber, thereby developing a relatively low pressure in said chamber.

15. A resilient device which may be interposed between a supporting element and an element comprising a load to be resiliently supported by said device and operable as an outside force thereon, comprising a body having a chamber therein filled with a compressible non-gaseous substance, two pistons spaced apart in axial alignment in said chamber, at least one additional piston in said chamber, means external of said body connecting said two axially-aligned pistons together for reciprocation in unison and including a controlled but variable connection with said additional piston for controlled but variable reciprocation thereof with said axially-aligned pistons, one of said axially-aligned pistons having a part projecting from one end of said body and the other piston having a part projecting from the other end of said body, whereby one of said piston parts may be engaged by an outside force to operate said pistons to compress the substance in said chamber, said pistons having operating areas of different size, respectively, the net difference between which results in the development of a relatively low pressure by said device.

16. A resilient device which may be interposed between a supporting element and an element comprising a load to be resiliently supported by said device and operable as an outside force thereon, comprising a body having a chamber open at opposite ends, a closure for each end of said chamber, a compressible non-gaseous substance filling said chamber, at least one piston reciprocable at each end of said chamber, and at least one additional piston spaced from the ends of said chamber and reciprocable therein, said pistons having operating areas of different size, means connecting the pistons at each end of said chamber for reciprocation in unison, and means external of said body providing a controlled but variable connection between said end pistons and said additional piston for controlled but variable reciprocation of said additional piston in said chamber, and one of said pistons at one end of said chamber having a part projecting through and beyond the closure member adjacent thereto for engagement by a force for actuation of said pistons.

17. A resilient device adapted to be interposed between a supporting element and an element comprising a load to be resiliently supported by said device and operable as an outside force thereon, comprising a body open at opposite ends thereof and having a chamber therein which is adapted to be filled with a compressible non-gaseous substance, a pair of pistons mounted at opposite ends of said chamber to reciprocate therein, cap means for closing the opposite ends of said chamber, each of said pistons having a rod portion projecting exteriorly of said chamber through a hole in the associated cap means, at least one additional piston mounted elsewhere in said chamber for reciprocation therein, means external of said body connecting said pair of pistons to reciprocate together and having a controlled but variable connection with said additional piston, the area of the interior face of one piston of said pair being greater than the combined area of the interior faces of the other pistons, the piston having the large interior face being disposed to be engageable by said outside force to compress said substance.

18. A resilient device which may be interposed between a supporting element and an element comprising a load to be resiliently supported by said device and operable as an outside force thereon, said device comprising a body having a chamber filled with a compressible non-gaseous substance, means for sealing against escape of said substance from said chamber, a plurality of pistons in said chamber of different operating areas, respectively, and including at least one piston disposed to be engaged by said outside force and having the larger proportion of the entire operating area of said plurality of pistons, means external of said body interconnecting said pistons so that they may be operated as a unit to compress said substance to a predetermined load limit including a controlled but variable connection with at least one piston, the actuation of the piston having the larger proportion of the entire operating area actuating said pistons, and means for restraining at least one other of said pistons from operation in unison with the piston having the larger operating area when said predetermined load limit has been exceeded.

19. A resilient device which may be interposed between a supporting element and an element comprising a load to be resiliently supported by said device and operable as an outside force thereon, said device comprising a body having a chamber filled with a compressible non-gaseous substance, means for sealing against escape of said substance from said chamber, at least three pistons in said chamber and having operating areas in contact with said compressible substance, means external of said body connecting said pistons so that they may be operated as a unit to compress said substance to a predetermined load limit, one piston having the larger proportion of the entire operating area and being engageable by said outside force to actuate all pistons, said connecting means including a controlled but variable connection with at least one of said other pistons and a lost-motion connection with said remaining piston, and means for restraining the pistons having the smaller proportion of the entire operating area from operation in unison with the piston having the larger operating area when said predetermined load limit has been exceeded.

20. A resilient suspension system which may be interposed between a supporting element and an element comprising a load to be resiliently supported by said system and operable as an outside force thereon, said system comprising a body having a chamber filled with a compressible non-gaseous substance, means for sealing against escape of said substance from said chamber, three pistons in said chamber having operating areas in contact with said compressible substance, two of said pistons being axially aligned, a rigid yoke external of said body connecting said axially-aligned pistons so that said pistons may be operated as a unit to compress said substance, one of said axially-aligned pistons having an operating area greater than the aggregate operating area of the other two pistons and being actuatable by said outside force, said third piston having a rod projecting exteriorly of said chamber, said yoke having a cam surface, the rod of said third piston having a cam follower riding on said cam surface for controlled, variable reciprocation of said third piston, the net difference in said operating areas of said pistons effecting the development of a relatively low pressure in said chamber.

References Cited in the file of this patent

UNITED STATES PATENTS

| | | |
|---|---|---|
| 2,155,521 | Zavarella | Apr. 25, 1939 |
| 2,723,847 | Hogan | Nov. 15, 1955 |
| 2,760,575 | Taylor | Aug. 28, 1956 |
| 2,766,037 | Taylor | Oct. 9, 1956 |